United States Patent Office 3,564,031
Patented Feb. 16, 1971

3,564,031
PROCESS FOR CONTINUOUS PRODUCTION OF MONO-ALKYLATED AROMATIC COMPOUNDS
Ralph H. Potts, La Grange, and Norman D. Gordon and Sydney H. Shapiro, Chicago, Ill., assignors to Armour Industrial Chemical Company, Chicago, Ill., a corporation of Delaware
No Drawing. Filed May 6, 1968, Ser. No. 727,058
Int. Cl. C08h 17/36
U.S. Cl. 260—413                                             6 Claims

ABSTRACT OF THE DISCLOSURE

A continuous process for mono-alkylation of aromatic compounds with unsaturated higher aliphatic compounds such as acids, amines, nitriles, esters, amides and alcohols in a hydrogen fluoride media to produce a high yield of mono-alkylated aromatic products. The mono-alkylated aromatic compounds of this invention are useful as plasticizers, emulsifiers and chemical intermediates.

BACKGROUND OF THE INVENTION

It has heretofore been proposed to alkylate aromatic compounds such as benzene, toluene, and naphthalene with unsaturated aliphatic compounds such as propylene, other lower olefins, and oleic acid using hydrofluoric acid as a condensing agent. As illustrative of such prior art, reference may be made to U.S. Pat. 2,275,312 and J. Am. Chem. Soc., 61, 1010–1015 (1939). As far as is known, however, no process of this kind has gone into commercial use, probably because of the relatively poor yields reported in the literature. This is especially true if it is desired to obtain high yields of mono-alkylated aromatic product, since processes of the above-cited references generally result in a high percentage of the product being polyalkylated. Further, the processes reported in the prior art require many hours, in the order of 16 to 24, to obtain the reported crude product yields. Heretofore, no process improvements have been described permitting the continuous production of high yields of higher mono-alkylated aromatic compounds on a commercially feasible basis.

Processes have been proposed for the production of arylaliphatic acids using acid clays. However, these processes have not been adapted commercially and do not present the advantages of the process of our invention, particularly since unsaturated aliphatic compounds with amino or nitrile substitutions do not undergo satisfactory reaction. Further, the acid clay process does not permit commercially feasible yields when benzene is used as an aromatic reactant.

It is an object of this invention to provide an improved and continuous process for mono-alkylation of aromatic carbocyclic compounds with unsaturated higher molecular weight aliphatic compounds. It is a further object of this invention to provide a continuous process for mono-alkylation of aromatic compounds requiring relatively short residence times. It is a further object of this invention to provide a continuous process for mono-alkylation of carbocyclic compounds with an unsaturated aliphatic compound wherein the aromatic reactant is used as the stripping gas in the recovery stage.

The continuous process of our invention for mono-alkylation of aromatic compounds comprises substantially continuously and substantially simultaneously introducing into a continuous reaction zone substantially anhydrous substituted unsaturated aliphatic hydrocarbon reactant having from 8 to 54 carbon atoms, substantially anhydrous aromatic reactant selected from the group consisting of mono-, di-, and tri-carbocyclic compounds and their substituted derivatives wherein said substitution is from 1 to 2 radicals selected from the group consisting of methyl, methoxy, phenoxy and hydroxy, said aromatic reactant being introduced at a molar rate of at least 2 moles per mole of said aliphatic reactant, and substantially anhydrous hydrogen fluoride, said hydrogen fluoride being introduced at a molar rate of at least 3 moles per mole of aliphatic reactant; mixing said reactants and hydrogen fluoride for a residence time of from about 2 to 60 minutes at a temperature of from about 0° to 50° C. to form arylated aliphatic products; then substantially continuously passing said products, excess aromatic reactant and hydrogen fluoride into a recovery zone having an upper and lower portion, said lower portion maintained at from about 100° to 275° C. freeing said product of excess aromatic reactant and hydrogen fluoride; removing said product from the lower portion of said recovery zone; removing said excess aromatic reactant, hydrogen fluoride from the upper portion of said recovery zone to a separator zone having an upper and lower portion and maintained at from about 20° to 30° C.; removing said hydrogen fluoride from the lower portion of said separator zone and returning to said reaction zone an amount of more than 90 percent recycle; and removing said excess aromatic reactant from the upper portion of said separator zone and returning to said reaction zone an amount of more than 90 percent recycle.

The feed stock to the continuous reaction zone is made up of unsaturated aliphatic reactants, aromatic reactants and hydrogen fluoride, which may be separately entered into the reaction zone. We have found that it is desirable for the feed stock to be deaerated and substantially anhydrous. By the terminology substantially anhydrous we mean that the reactants should not contain sufficient water to permit build up of water in the hydrogen fluoride to an amount of about 12 percent. Preferably, the water content of the reactants upon introduction is less than about 2 percent. We have found that accumulation of more than about 12 percent water in the hydrogen fluoride slows the reaction appreciably. Any water introduced with fresh reactants will accumulate in the recycled hydrogen fluoride phase of the system. Thus, it is desirable in the continuous and high recycle system of our invention to remove the water in the recycled hydrogen fluoride by azeotropic removal, and further to deaerate and remove water from freshly fed reactants. This may be accomplished by heating the reactants to about 85° C. and subjecting them to a vacuum of about 26 inches of mercury.

The aliphatic reactant, the aromatic reactant, and the hydrogen fluoride are substantially continuously and substantially simultaneously introduced into a continuous reaction zone. By substantial continuous and substantial simultaneous we mean to include intermittent addition of either or both of the reactants and even the alternative introduction of the reactants as long as the composition of the materials in the reaction zone are not altered beyond proportions set forth below. The aromatic reactant should be introduced at a flow rate such that the ratio of aromatic to aliphatic reactant is at least 2, preferably the ratio of aromatic to aliphatic reactant introduced and present in the reaction zone is from about 4 to 10. An excess of aromatic reactant of a ratio of more than 10 can be employed. The feed rate of hydrogen fluoride should be such that the ratio of hydrogen fluoride to aliphatic reactant is at least 3. It is preferred to use a molar ratio of hydrogen fluoride to aliphatic reactant of from about 4 to 10. A greater ratio may be employed.

The continuous reaction zone may be a reactor of any suitable configuration known to the art providing agitation and means for maintaining temperature at from about 0° to 50° C. When using benzene and oleic acid, the temperature is preferably maintained at about 25° to 40° C. The reaction is exothermic and cooling means such as a cooling jacket are necessary. Vertical or horizontal vessels may be used.

The reactants and hydrogen fluoride are introduced toward one end of the reaction zone and the arylated aliphatic product, excess aromatic reactant and hydrogen fluoride removed from the other end of the reaction zone. The residence time in the reaction zone depends upon the design of the vessel, but the reaction is essentially complete in a very few minutes residence time. We have found residence times of from about 2 to 60 minutes to be suitable and we prefer a residence time of from about 10 to 20 minutes.

The arylated aliphatic product, excess aromatic reactant and hydrogen fluoride, is passed into a recovery zone to free the arylated aliphatic product from the excess aromatic reactant, hydrogen fluoride, and traces of water. Contrary to known techniques of alkylation in the petroleum industry utilizing hydrogen fluoride wherein the product is freed from hydrogen fluoride by gravity settling, our process requires distillation. In our process the excess aromatic reactant is utilized as a stripping gas, thus obviating the need for addition of a stripping gas. We have found that operating the recovery zone at from about 100° to 275° C. we obtain good separation of desired product from the excess aromatic reactant and hydrogen fluoride, the excess aromatic reactant and hydrogen fluoride being removed from the upper portion of said recovery zone and the product being removed from the lower portion of said recovery zone. We have found that when using oleic acid and benzene reactants especially satisfactory results may be obtained by operating the recovery zone at from about 140° to 180° C. Various stripping vessels known in the art are suitable, however, we prefer a packed or trayed stripping column having a steam jacketed heating element around its lower portion. We have found that the efficiency of the recovery zone may be greatly increased by first passing the arylated aliphatic product, the excess aromatic reactant, and hydrogen fluoride through an overhead flasher to remove the bulk of the excess aromatic reactant and hydrogen fluoride by maintaining a temperature of from about 40° to 80° C. The greatest proportion of hydrogen fluoride and excess aromatic reactant is flashed off lead the desired product containing lesser amounts of excess aromatic reactant and hydrogen fluoride are removed from the bottom of the flash pot and fed into the above described stripper.

We have found it advantageous to collect all of the excess aromatic reactant and hydrogen fluoride in a separator zone wherein the temperature is maintained to minimize the solubility of hydrogen fluoride in excess aromatic reactant and of excess aromatic reactant in hydrogen fluoride. We have found the separator zone should be maintained at from about 20° to 30° C. The hydrogen fluoride settles and may be removed from the lower portion of the separator and the excess aromatic reactant removed from the upper portion of the separator. We have found that more than 90 percent, and generally more than 95 percent of the hydrogen fluoride and excess aromatic reactant may be recycled.

The continuous closed system of our invention may be operated under a pressure of from about 0 to 20 p.s.i.g., preferably from about 1 to 15 p.s.i.g. The preferred reaction zone pressure is from about 9 to 15 p.s.i.g., and the preferred recovery zone pressure is from about 5 to 10 p.s.i.g.

The mono-alkylation process of this invention may be carried out on a wide variety of aromatic compounds such as benzene, naphthalene, anthracene compounds which may either be substituted or unsubstituted. Prefered aromatic compounds include mono-, di- and tricarbocyclic compounds and their substituted derivatives wherein the substitution is from 1 to 2 radicals selected from the group consisting of methyl, methoxy, phenoxy, and hydroxy. A preferred sub-class of aromatic compounds includes mono- and di-carbocyclic compounds substituted with 1 to 2 methyl, methoxy, phenoxy, or hydroxy groups. An especially preferred sub-class of aromatic compounds includes the mono-carbocyclic compound benzene and benzene substituted with from 1 to 2 radicals selected from the group consisting of methyl, methoxy, phenoxy, and hydroxy groups. Preferred substituted compounds include toluene, anisole, phenol, phenylether, resorcinol, xylene, veratrole, cresol, naphthol, methylnaphthalene, methoxynaphthalene, anthranol, and di-methylanthracene. Mixtures of such aromatic compounds may be used.

Substituted unsaturated aliphatic hydrocarbon compounds useful in the process of this invention include unsaturated aliphatic compounds having from 8 to 54 carbon atoms and at least one unsaturated or olefinic linkage. Substituents selected from the group consisting of acids, esters, alcohols, ethers, and nitrogen derivatives are suitable. Especially suitable nitrogen derivatives include amines, nitriles, and amides. Monomeric and polymeric unsaturated aliphatic compounds are suitable. One sub-class of preferred compounds includes substituted unsaturated aliphatic hydrocarbon monomeric compounds having from 8 to 22 carbon atoms. Unsaturated carboxy acids such as are obtained from animal or vegetable fats and oils are particularly suitable. Specifically preferred examples which may be used include oleic acid, 9-octadecenyl amine, erucic acid, unhydrogenated tallow, castor oil, linoleic acid, ricinoleic acid, 10-undecenoic acid, oleyl nitrile, oleyl alcohol, methyl oleate and oleylamide. Particularly desirable results have been obtained using oleic acid and its derivatives such as 9-octadecenyl amine and nitrile. Another sub-class of preferred compounds includes substituted unsaturated aliphatic hydrocarbon dimeric and trimeric compounds having from 22 to 54 carbon atoms. Substituents selected from the group consisting of acids, esters, alcohols, ethers, and nitrogen derivatives are suitable. The dimers from oleic acid and mixed acids such as found in natural oils such as tall oil are especially preferred. Mixtures of different substituted unsaturated aliphatic hydrocarbon compounds can be used, and other non-reacting saturated aliphatic compounds may be present.

The alkylation using 9-octadecenyl nitrile (oleyl-nitrile) presents a particular problem since the nitrile group is a reactive group. The process of this invention, however, promotes the desired mono-alkylation reaction and a minimum of undesired reaction between the nitrile and olefinic bonds. The previous processes have not been adapted to alkylation using an unsaturated compound having a reactive group such as the nitrile, relatively low yields having been obtained even when the reactant was olefinic acid.

The earlier work has been performed primarily on lower molecular weight olefins such as propylene which are known to be much more reactive in alkylation reactions than higher chain length olefinic materials.

When an unsaturated aliphatic acid is reacted with phenol according to the process of this invention, some esterification may occur as a side reaction between the hydroxy and carboxyl groups. This side reaction, however, is not unduly detrimental to the main alkylation reaction which proceeds unaffected. Any portion of the product in the ester form can be easily hydrolyzed to the free acid, if desired.

We have found the continuous process of our invention to be especially suitable for the continuous mono-alkylation of oleic acid with benzene, producing phenylstearic acid, principally 9(10)phenylstearic acid. This process using benzene is of especial importance due to the fact that the mono-alkylation of benzene has not been found to proceed in a commercially acceptable manner by other means, such as acid clay processes. We have found that high crude yields of product are obtained which upon analysis show from 60 to 70 percent of the crude product is the mono-alkylated product, phenylstearic acid.

The following examples are presented to illustrate the present invention.

EXAMPLE I

Phenylstearic acid, primarily 9(10)phenylstearic acid, was continuously produced in high yield by the following described process. A vertical reactor containing four peripheral shelves and a blade type agitator between each shelf was continuously charged at the upper portion of the reactor with distilled commercial grade oleic acid having a typical analysis of oleic acid 79%, linoleic acid 4.0%, palmitoleic acid 6.5%, linolenic acid 1.0% myristoleic acid 1.5%, and 7 to 8% saturated long chain fatty acids at a feed rate of 890 pounds per hour, benzene at a feed rate of 1250 pounds per hour, and hydrogen fluoride at a feed rate of 320 pounds per hour, all of the feed stock being substantially anhydrous (containing less than about 2% water). The reactor was maintained at a temperature of about 41° C. and a pressure of about 15 p.s.i.g. The residence time in the reactor was 20 minutes. The effluent from the bottom of the reactor was passed through a flasher maintained at a temperature of 22° C. and pressure of about 1 p.s.i.g. The largest portion of excess reactant, benzene, and hydrogen fluoride was removed from the flasher overhead and passed through a water condenser into a separator. The effluent from the bottom of the flash pot containing the product and remainder of excess benzene and hydrogen fluoride was introduced at about the mid point of a trayed stripping column, the lower portion of which was maintained at 135° C., and a pressure of 1 p.s.i.g. The remainder of the excess benzene reactant, hydrogen fluoride and water was removed from the stripper overhead, through a water condenser to the separator. The desired product was removed from the bottom of the stripper column at a rate of 1000 pounds per hour. The crude product had the following analysis:

| Gas chromatography (G.C.) | Percent |
| --- | --- |
| Unreacted aliphatic compounds | 13 |
| Phenylated acids | 87 |
| Thin layer chromatography (T.L.C.) | |
| Primarily mono-alkylated acid | 80 |
| Dimers | 15 |
| Higher boilers (pitch) | 5 |
| Hydrogen fluoride residue | 0.94 |
| Water | Trace |

The separator was operated at about 25° C. to separate the benzene and hydrogen fluoride, 1025 pounds per hour of benzene being recycled to the reactor and 305 pounds per hour of hydrogen fluoride being recycled to the reactor.

EXAMPLE II

Phenylstearic acid was produced by using the same reactants as in Example I in the same apparatus with the feed rate to the reactor as follows:

| | Pounds per hour |
| --- | --- |
| Distilled commercial grade oleic acid | 890 |
| Benzene | 1250 |
| Hydrogen fluoride | 320 |

The reactor was maintained at 40° C. and 13 p.s.i.g. The residence time in the reactor was 20 minutes. The flasher was maintained at 88° C. and 7.5 p.s.i.g., and stripper at 148° C. and 8 p.s.i.g. The crude product yield was 990 pounds per hour having the following analysis:

| | |
| --- | --- |
| Unreacted aliphatic compounds by G.C. (percent) | 17 |
| Phenylated acids by G.C. (percent) | 83 |
| Acid value (washed) | 160 |
| Hydrogen fluoride residue (percent) | 0.3 |
| Water (percent) | 1.0 |
| Pounds per hour benzene recycled | 1017 |
| Pounds per hour hydrogen fluoride recycled | 315 |

EXAMPLE III

Phenylstearic acid was produced by using the same reactants as in Example I in the same apparatus with the feed rate to the reactor as follows:

| | Pounds per hour |
| --- | --- |
| Distilled commercial grade oleic acid | 710 |
| Benzene | 1000 |
| Hydrogen fluoride | 225 |

The reactor was maintained at 45° C. and 9 p.s.i.g. The residence time in the reactor was 25 minutes. The flasher was maintained at 82° C. and 5 p.s.i.g., and the stripper at 125° C. and 5 p.s.i.g. The crude product yield was 840 pounds per hour having the following analysis:

G.C.

| | |
| --- | --- |
| Unreacted aliphatic compounds (percent) | 19.2 |
| Phenylated acids (percent) | 80.8 |

T.L.C.

| | |
| --- | --- |
| Primarily mono-alkylated acid (percent) | 70 |
| Dimers (percent) | 25 |
| Higher boilers (pitch) (percent) | 5 |
| Acid value (washed) | 144 |
| Hydrogen fluoride residue (percent) | 1.0 |
| Water (percent) | 0.3 |
| Pounds per hour benzene recycled | 821 |
| Pounds per hour hydrogen fluoride recycled | 240 |

EXAMPLE IV

Phenylstearic acid was produced by using the same reactants as in Example I in the same apparatus with the feed rate to the reactor as follows:

| | Pounds per hour |
| --- | --- |
| Distilled commercial grade oleic acid | 1035 |
| Benzene | 1460 |
| Hydrogen fluoride | 525 |

The reactor was maintained at 36° C. and 11 p.s.i.g. The residence time in the reactor was 16.5 minutes. The flasher was maintained at 90° C. and 6.5 p.s.i.g., and stripper at 130° C. and 6 p.s.i.g. The crude product yield was 1210 pounds per hour having the following analysis:

G.C.

| | |
| --- | --- |
| Unreacted aliphatic compounds (percent) | 17 |
| Phenylated acids (percent) | 83 |

T.L.C.

| | |
| --- | --- |
| Primarily mono-alkylated acid (percent) | 75 |
| Dimers (percent) | 20 |
| Higher boilers (pitch) (percent) | 5 |
| Hydrogen fluoride residue (percent) | 1.2 |
| Pounds per hour benzene recycled | 1200 |
| Pounds per hour hydrogen fluoride recycled | 500 |

EXAMPLE V

Phenylstearic acid was produced by using the same reactants as in Example I and in the same apparatus except that a flasher was not used, the effluent from the reactor being fed directly into the stripper. The feed rate to the reactor was as follows:

| | Pounds per hour |
| --- | --- |
| Distilled commercial grade oleic acid | 500 |
| Benzene | 730 |
| Hydrogen fluoride | 187 |

The reactor was maintained at 30° C. and 11 p.s.i.g. The residence time in the reactor was 34 minutes. The stripper was operated at 143° C. and 8 p.s.i.g. The crude product yield was 619 pounds per hour having the following analysis:

G.C.
- Unreacted aliphatic compounds (percent) ____ 12
- Phenylated acids (percent) _____ 88

T.L.C.
- Primarily mono-alkylated acid (percent) ____ 90
- Dimers (percent) _____ 9
- Higher boilers (pitch) (percent) _____ 1

Acid value (washed _____ 158
Hydrogen fluoride residue (percent) _____ 0.40
Water (percent) _____ Trace
Pounds per hour benzene recycled _____ 602
Pounds per hour hydrogen fluoride recycled _____ 182

While in the foregoing specification this invention has been described in relation to certain preferred embodiment thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A continuous process for mono-alkylation of aromatic compounds comprising substantially continuously and substantially simultaneously introducing into a continuous reaction zone substantially anhydrous oleic acid, substantially anhydrous benzene, said benzene being introduced at a molar rate of at least 2 moles per mole of said oleic acid, and substantially anhydrous hydrogen fluoride, said hydrogen fluoride being introduced at a molar rate of at least 3 moles per mole of oleic acid; mixing said reactants and hydrogen fluoride for a residence time of from about 2 to 60 minutes at a temperature of from about 0° to 50° C. to form phenylstearic acid; then substantially continuously passing said phenylstearic acid, excess aromatic reactant and hydrogen fluoride into a recovery zone having an upper and lower portion, said lower portion maintained at from about 100° to 275° C. freeing said phenylstearic acid of excess aromatic reactant and hydrogen fluoride; removing said phenylstearic acid from the lower portion of said recovery zone; removing said excess aromatic reactant and hydrogen fluoride from the upper portion of said recovery zone to a separator zone having an upper and lower portion and maintained at from about 20° to 30° C.; removing said hydrogen fluoride from the lower portion of said separator zone and returning to said reaction zone an amount of more than 90 percent recycle; and removing said excess aromatic reactant from the upper portion of said separator zone and returning to said reaction zone an amount of more than 90 percent recycle.

2. The process of claim 1 wherein the molar ratio of benzene to oleic acid is from about 4 to 10.

3. The process of claim 1 wherein the molar ratio of hydrogen fluoride to oleic acid is from about 4 to 10.

4. The process of claim 1 wherein said residence time is from about 10 to 20 minutes.

5. The process of claim 1 wherein said reaction zone is maintained at about 25 to 40° C.

6. The process of claim 5 wherein the temperature of said recovery zone is from about 140° to 180° C.

References Cited

UNITED STATES PATENTS

| | | | |
|---|---|---|---|
| 2,275,312 | 3/1942 | Tinker et al. | 260—515 |
| 2,525,889 | 10/1950 | Frey et al. | 260—413 |

ELBERT L. ROBERTS, Primary Examiner

E. G. LOVE, Assistant Examiner

U.S. Cl. X.R.

260—404, 410, 465, 558, 611, 617, 671